United States Patent
Kitson et al.

Patent Number: 6,081,553
Date of Patent: Jun. 27, 2000

[54] BLOCK-MATCHING MOTION ESTIMATION TECHNIQUE FOR VIDEO COMPRESSION OF NOISY SOURCE SIGNALS

[75] Inventors: Frederick Lee Kitson, Fremont; Robert Marcus Armitano, Palo Alto, both of Calif.; Ronald William Schafer, Atlanta, Ga.

[73] Assignee: Hewlett Packard Company, Palo Alto, Calif.

[21] Appl. No.: 09/056,395

[22] Filed: Apr. 6, 1998

[51] Int. Cl.$^7$ ....................................................... H04N 7/36
[52] U.S. Cl. ............................ 375/240; 348/416; 348/699
[58] Field of Search .................................... 348/384, 390, 348/400, 401, 402, 409, 415, 416, 699; 375/240

[56] References Cited

U.S. PATENT DOCUMENTS

| | | | |
|---|---|---|---|
| 5,557,341 | 9/1996 | Weiss | 348/412 |
| 5,661,524 | 8/1997 | Murdock | 348/416 |
| 5,682,209 | 10/1997 | Borgwardt | 348/416 |
| 5,748,248 | 5/1998 | Parke | 348/416 |

*Primary Examiner*—Bryan Tung

[57] ABSTRACT

A method for operating a data processing system to compress a first frame in an ordered sequence of image frames. A second frame precedes the first frame in the sequence of frames, and the second frame is preceded by a third frame in the sequence of frames. Each frame is divided into a plurality of processing blocks. The method first determines a displacement vector for at least one block in the second frame. The displacement vector identifies a region in the third frame that is an approximation of the block in the second frame. The displacement vectors in the second frame and measured vectors in the first frame are then used to determine an approximation for a displacement vector associated with one of the blocks in the first frame. This approximation is then used to define a search region in a frame preceding the first frame. The search region includes a plurality of sub-regions, each of the sub-regions having the same size as that block. The search region is then searched for the sub-region that best approximates the corresponding block in the first frame. In one embodiment of the present invention, the approximation to the displacement vector in the first frame is determined by forming a weighted sum of displacement vectors determined for the preceding frames. The coefficients of the weighted sums are determined by fitting the observed displacement vectors for a number of frames in the sequence.

6 Claims, 2 Drawing Sheets

BLOCK-MATCHING MOTION ESTIMATION TECHNIQUE FOR VIDEO COMPRESSION OF NOISY SOURCE SIGNALS

FIELD OF THE INVENTION

The present invention relates to video compression techniques, and more particularly, to an improved motion estimation technique for use therein.

BACKGROUND OF THE INVENTION

Images are conventionally represented by a two-dimensional array of values in which each value represents a property of the image at a corresponding point on the image. In the case of gray-scale images, a single number representing the gradations of intensity from white to black, referred to as the gray scale, is stored. In the case of color images, each "value" is a vector whose components represent the gradations in intensity of the various primary colors, or some alternative color code, at the corresponding point in the image. A motion picture comprises a sequence of such images. Typically, 24 or more images are needed for each second of viewing time.

This representation of a motion picture corresponds to the output of a typical image-sensing device such as a television camera. Such a representation is convenient in that it is easily regenerated on a display device such as a CRT tube. However, the number of bits needed to represent the data is prohibitively large for many applications. A single 512×512 gray-scale image with 256 gray levels requires in excess of 256,000 bytes. At 30 frames per second, a communication channel with a bandwidth of approximately 64 million bits per second is needed to transmit the motion picture. A full color 24 bit per pixel motion picture would require a bandwidth of more than 190 million bits per second.

This bandwidth is significantly greater than that available for many communications purposes. In addition, the storage required for a two hour digitally recorded movie exceeds the storage capacity of the available CDs. Hence, some form of image compression system must be utilized to store and transmit high quality video signals.

Image compression systems used in motion picture compression applications make use of the redundancy within frames and between frames to reduce the amount of information needed to represent the video sequence. For example, many scenes in a motion picture include portions that are constant from frame to frame for several seconds, if not minutes. The constant portion need only be sent once. Hence, if the constant portion comprises a significant fraction of the scene, considerable image compression can be realized. For example, if the entire scene were constant for 10 seconds, the information needed to reproduce the scene would be contained in one frame of the sequence and an indication of the number of times the frame is to be repeated. This would be approximately 1/300 of the information needed if the scene were sent without compression.

One method for representing a sequence of images is to utilize an image as a reference frame. Successive frames in the sequence are then represented by a two step process. First, the current frame is divided into a series of blocks. The frame is approximated by finding blocks in the reference frame that match the blocks in the current frame. The blocks in the reference frame may be displaced from the blocks in the current frame. This approximation may be viewed as a set of instructions in the form "reproduce the block starting at coordinates (n,m) in the current frame by the block at coordinates (N,M) in the reference frame". The sequence of instructions provides an approximation of the second frame. This approximation is then subtracted from the current frame to form a residual frame. Ideally, the residual frame has substantially less information than the current frame. The residual frame is then further compressed using one of the still image compression algorithms such as the discrete cosine transform (DCT) or subband coding algorithms.

Many models have been devised to represent the apparent motion in a video sequence. However, the constraints imposed by the computational costs associated with performing motion estimation limit commercial video coder systems to models that only track transnational motion. In such block-matching algorithms (BMAs), it is assumed that every pixel in a block has the same motion relative to the block in the reference frame, and that each block in the current frame is predicted from blocks in the reference frame that have undergone some type of motion.

Even with these constraints, BMA systems impose significant computational loads on the compression system. Consider a system in which an N×N frame is divided into n×n blocks. Each block must be compared to all possible blocks in the reference frame from which it could have been derived by the motion of an object in the reference frame. The simplest matching algorithm computes the sum of the absolute difference of the pixel values between a candidate block in the reference frame of the block in the current frame. Hence, a minimum of $n^2$ subtractions are required per candidate block. If the region in the reference frame over which the search is performed is M×M pixels, then the computational workload is of order $M^2n^2$ per block in the current frame. Hence, it is advantageous to minimize the search area, i.e., reduce M.

If the search area is set too small, the best match will not always be found, since the corresponding block may be outside the search area. In the absence of noise, this case can be detected by noting that the best fit lies on the boundary of the search area in some cases. However, in the presence of noise, the function being optimized will have local minima generated by the noise. These local minima can be mistaken for a match. When this occurs, the approximation created by the BMA is poor, and the degree of compression obtainable is significantly reduced. If the compress algorithm maintains a minimum compression ratio, the quality of the reconstructed image may also be reduced.

Accordingly, in prior art systems, the search area is set to encompass the maximum area that a block could have moved from one frame to the next given typical speeds with which objects move in the physical world to avoid missing the matching block in the reference frame. This leads to an increased computational load.

Broadly, it is the object of the present invention to provide an improved image compression system for motion picture sequences.

It is a further object of the present invention to provide an improved BMA.

It is a further object of the present invention to provide a BMA that is robust in the presence of noise than prior art BMAs.

It is a still further object of the present invention to provide a BMA having a smaller search area than prior art BMAs.

These and other objects of the present invention will become apparent to those skilled in the art from the following detailed description of the invention and the accompanying drawings.

SUMMARY OF THE INVENTION

The present invention is a method for operating a data processing system to compress a first frame in an ordered sequence of image frames. The first frame is preceded by a second frame in the sequence of frames, and the second frame is preceded by a third frame in the sequence of frames. Each frame is divided into a plurality of processing blocks. The method first determines a displacement vector for at least one block in the second frame. The displacement vector identifies a region in the third frame that is an approximation of the block in the second frame. The displacement vectors in the second frame are then used to determine an approximation for a displacement vector associated with one of the blocks in the first frame. Displacement vectors in the first frame are used in the approximation as they become available. This approximation is then used to define a search region in a frame preceding the first frame. The search region includes a plurality of sub-regions, each sub-region having the same size as that block. The search region is then searched for the sub-region that best approximates the corresponding block in the first frame. In one embodiment of the present invention, the approximation to the displacement vector in the first frame is determined by forming a weighted sum of displacement vectors determined for the preceding frames and first frame. The coefficients of the weighted sums are determined by fitting the observed displacement vectors for a number of frames in the sequence.

DETAILED DESCRIPTION OF THE INVENTION

Figure 1:
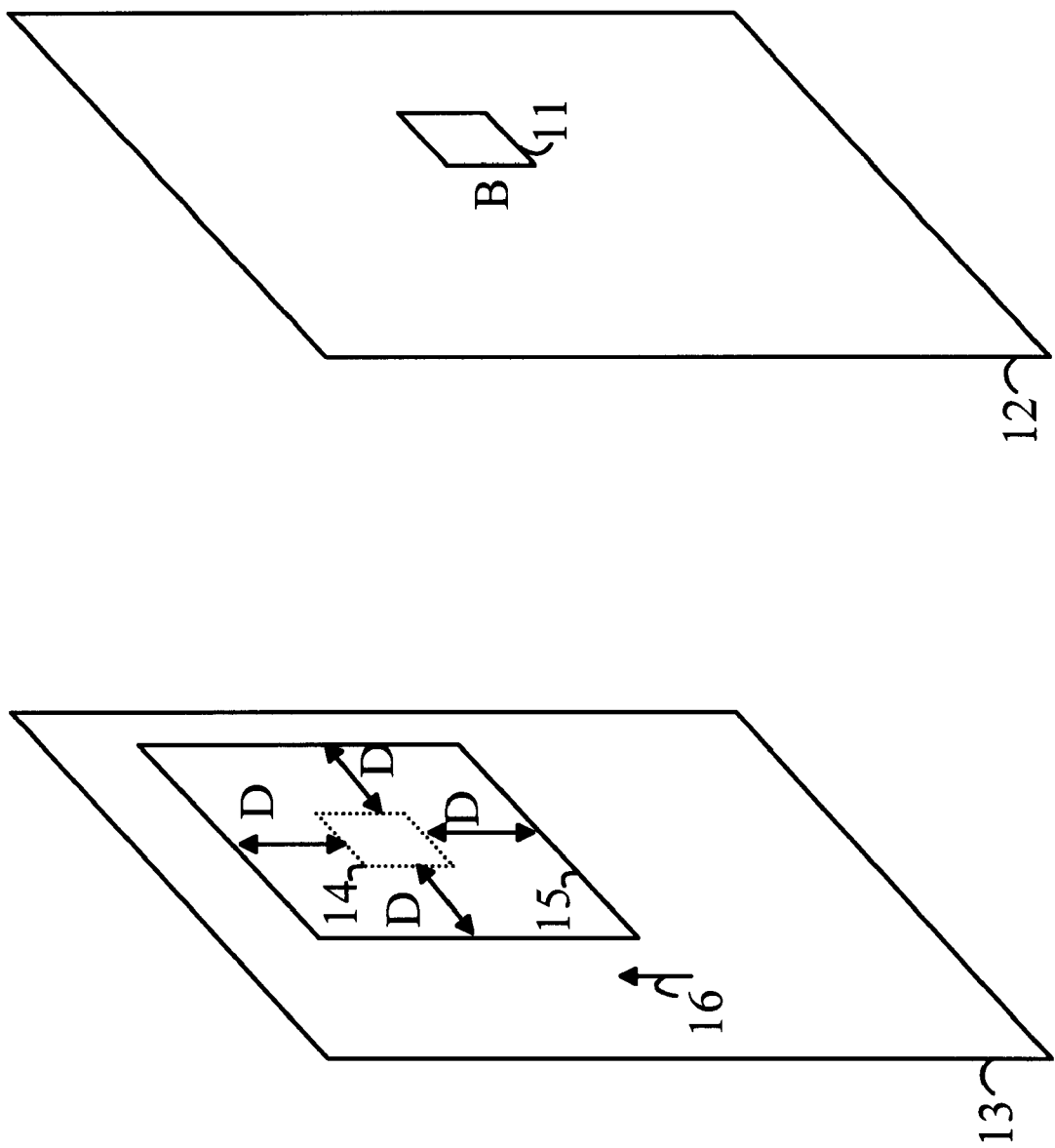
FIG. 1 illustrates the manner in which a conventional block matching algorithm identifies matching blocks in two frames of a motion picture sequence.

The manner in which the present invention operates may be more easily understood with reference to FIG. 1, which illustrates the manner in which a conventional block matching algorithm identifies matching blocks in two frames of a motion picture sequence. Consider a block 11 in frame 12, which is the current frame being compressed. The goal of the block matching algorithm is to find the block of the same size in reference frame 13 that most closely matches block 11. If the objects in frame 11 remained stationary over the time interval between frames 12 and 13, the matching block would be at location 14. The prior art block matching methods assume that a block in the current frame could have been derived from any block in the reference frame within a distance of ±D of the current block where D=v*t. Here, v is the maximum velocity that an object can travel and t is the time interval that has elapsed between the reference frame and the current frame. This search region is shown at 15.

The present invention provides its advantages by providing a more accurate estimation of the search region. The better estimation provided by the present invention allows the search region to be reduced in size. For example, if it were known that the objects in frame 13 were all moving in the direction shown by arrow 16, the top half of the search region could be eliminated.

In general, the objects in any frame would be expected to move with different velocities. For any frame, one can determine a displacement vector for each block on the frame by measuring the displacement between the block in question and the block in the reference frame which best matches that block. In the following discussion, it will be assumed that a reference coordinate system is defined on frame. If the block at coordinates (n,m) in the current frame best matches a block of the same size at coordinates (k,j) in the reference frame, the displacement vector associated with the block at (n,m) is (n-k, m-j). Hence, after each block in a frame has been associated with a corresponding block in the reference frame, a displacement vector can be assigned to each block in the current frame.

The present invention makes use of the displacement vectors measured in previous frames and current frame to predict the displacement vector associated with each block in the current frame. The predicted displacement vector is then used to define the search region in the reference frame over which the block matching algorithm operates. Once a matching block is found in the search region, the measured displacement vector replaces the predicted displacement vector.

Figure 2:
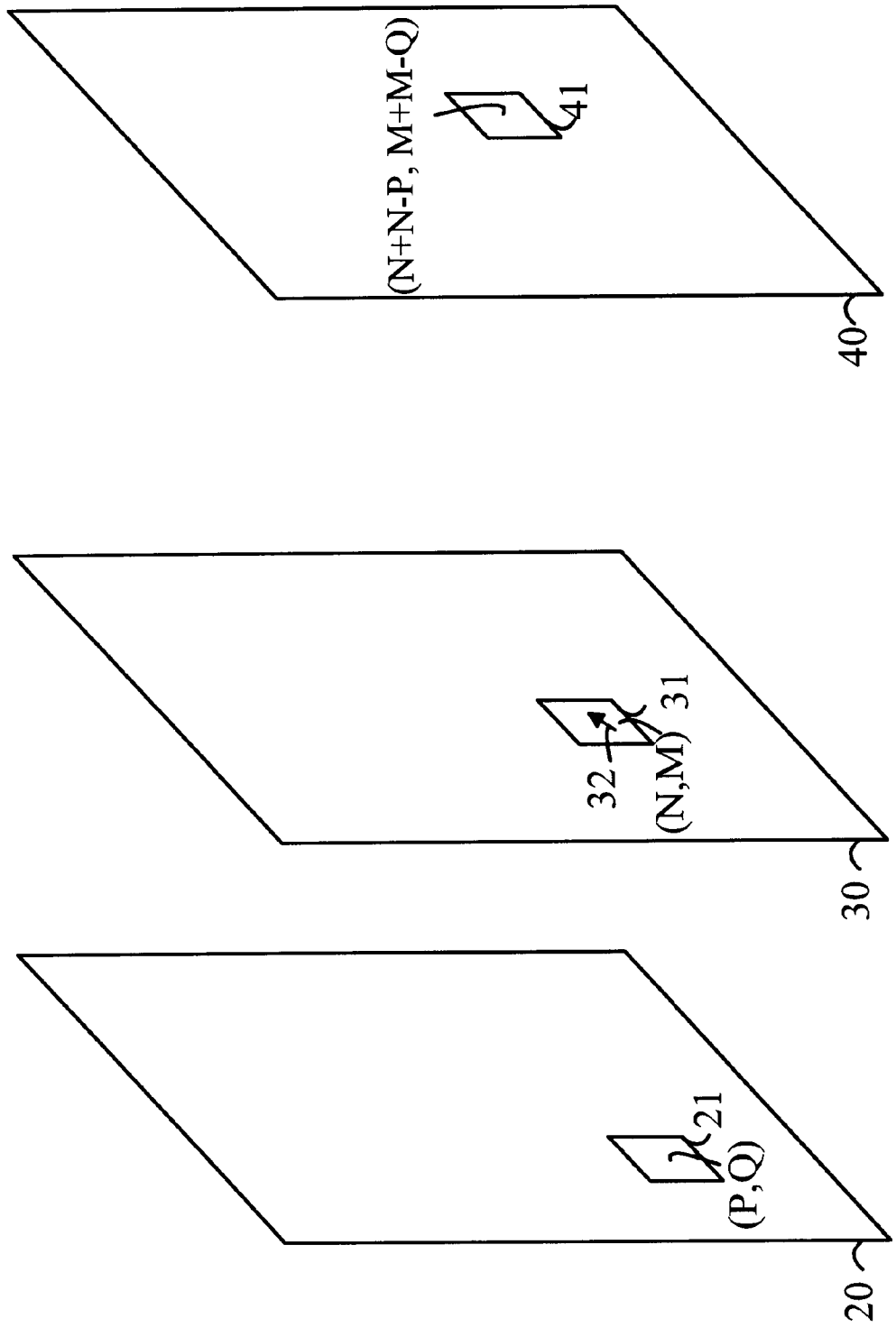
FIG. 2 illustrates the manner in which an approximation to a displacement vector in a first frame is computed from the observed displacements in preceding frames.

The manner in which the present invention operates may be more easily understood with reference to FIG. 2, which illustrates three successive frames in a video sequence. It is assumed that all of the blocks in frame 30 that have matching blocks in frame 20 have been found. One such block is shown at 31. Block 31 which is centered at coordinates (N,M) was found to match block 21, centered at coordinates (P,Q) in frame 20. Hence, a displacement vector 32 can be associated with block 31. The displacement vector indicates the displacement that took place in moving from frame 20 to frame 30. In the simplest embodiment of the present invention, it is assumed that block 31 will continue to move with the same velocity measured between frames 20 and 30. Accordingly, a predicted displacement vector in frame 40 can be assigned to the block centered at coordinates (N+N−P, M+M−Q). The components of this predicted displacement vector are assumed to be the same as those of block 31, i.e., (N−P, M−Q).

Once predicted displacement vectors based on the vectors computed for frame 30 have been assigned to blocks in frame 40, the predicted displacement vectors may be utilized to define the search region in frame 30 that corresponds to each block in frame 40. First, it should be noted that the predicted displacement vectors computed from frame 30 will not, in general, correspond to the blocks of frame 40. As discussed above, each frame is divided into a predetermined set of blocks. The projection of block 31 into frame 40 discussed above, will, in general, not coincide with one of these predetermined blocks. That is, the block centered at (N+N−P, M+M−Q) will not be the center of one of the predetermined blocks in 40. Hence, the predicted displacements computed by projecting blocks from frame 30 into frame 40 must first be interpolated to generate projected displacements for each of the predetermined blocks in frame 40.

Once a predicted displacement vector has been assigned for a block in frame 40, a search region in frame 30 corresponding to that block is defined. If the block in frame 40 is centered at coordinates (X,Y) than the search region in frame 30 will be centered at (X−$D_x$, Y−$D_y$) where ($D_x$, $D_y$) is the predicted displacement vector computed for the block in frame 40. The size of the search region will be somewhat greater than the size of the corresponding block in frame 40, and depends on the uncertainty in the predicted displacement vector.

To simplify the following discussion, the following notation will be utilized. It will be assumed that search regions in the $(n-1)^{st}$ frame are being sought corresponding to blocks in the $n^{th}$ frame, and that displacement vectors have been computed for at least the frames preceding the $n^{th}$ frame, i.e., frames (n−1), (n−2), etc. Each frame is assumed to be divided into B blocks. The blocks are numbered from 1 to B and the positions of the blocks in the $n^{th}$ frame are the same as the positions of the blocks in the $(n-1)^{st}$ frame for all n. The displacement vectors corresponding to the blocks in the $k^{th}$ frame will be denoted by $^kD_i=(^kD_{ix}, {}^kD_{iy})$, for i running from 1 to B.

The procedure discussed above can be seen to be equivalent to computing the predicted displacement vectors in the $n^{th}$ frame via a linear combination of the displacement vectors in the $(n-1)^{st}$, i.e., $$^nD_i = \sum_{j=1}^{B} a_{i,j}^{n-1} D_j \qquad (1)$$

Here, the coefficients $a_{ij}$ arise from the linear interpolation of the displacement vectors projected from the $(n-1)^{st}$ frame into the $n^{th}$ frame.

The above-described simple example only made use of the displacement vectors computed for the preceding frame. However, it will be obvious to those skilled in the art from the preceding discussion that including information on the displacement vectors in additional preceding frames can further refine the approximation of the displacement vectors in the $n^{th}$ frame. The additional information provides immunity from the noise in any single frame. Eq. (1) can be generalized as follows to take into account the measured displacement vectors in the K preceding frames:

$$^nD_i = \sum_{j=1}^{B} \sum_{k=1}^{K} {}^k a_{i,j}^{n-k} D_j \qquad (2)$$

To compute the estimated displacement vectors in the $n^{th}$ frame, each of the coefficients, $^ka_{ij}$, must be known. These coefficients may be computed using the measured displacement vectors for the previous K frames. That is, a system of K×B×B vector equations can be generated by writing Eq. (2) for n=n−1, n−2, . . . , n-K and solving this system for the coefficients $^ka_{ij}$. It should be noted that additional frames may be utilized to generate additional equations. In this case, a least squares fitting method may be utilized to determine the coefficients.

In practice, the value of the information in frames preceding the current frame decreases rapidly with the distance from the present frame. In addition, the computational workload involved in solving for the set of coefficients increases rapidly with the number of previous frames that are to be included. Hence, K is generally less than 4 in the preferred embodiment of the present invention.

In principle, the coefficients, $^ka_{ij}$, should be recomputed for each new frame prior to computing the predicted displacement vectors. However, in many cases, the rate of change of the scene in the video sequence is slow, and hence, the coefficients do not change rapidly from frame to frame. In this case, the coefficients are only re-computed when the actual displacement vectors computed for the current frame differ significantly from the values predicted by Eq. (2).

If the blocks in the frame are small compared to the moving objects, there will also be a correlation between the displacement vectors in each frame. In this case, additional information can be obtained by expanding the terms in Eq. (2) to include predicted displacement vectors from the current frame. That is, the sum on k would now run from 0 to K and the coefficients corresponding to $^nD_i$ are set to zero.

The above discussion assumes that a good estimate for a displacement vector can be generated for each block in the frame currently being coded. There are clearly cases in which this will not be possible. Video sequences tend to be organized into scenes. Within each scene, the frames will have a high degree of correlation, and the degree of compression can be significantly enhanced by utilizing a block motion approximation. However, at the beginning of a scene, there is no method for assigning displacement vectors to the first frame since it is not likely to be related to the previous frame. Similarly, when the camera pans, a portion of the scene leaves the field of view, and new objects enter the field of view. The new material often will not correspond to any block in the preceding frames, and hence, displacement vectors for the new area are not defined.

As noted above, the actual video compression operation may be viewed as a two step process. First a block matching approximation to the frame is generated by utilizing the BMA. This approximation is subtracted from the frame to generate a residual frame, which is coded using DCT or some other form of still image compression. If the BMA fails, then block motion approximation will be a poor approximation to the frame and the residual frame will have as much information as the original frame. The still image compression system will be forced to code all of the information. This will lead to a lower compression ratio for the frame in question; however, it will not lead to degradation in the video sequence when the compressed sequence is decompressed.

In the case of a partial inability to find matching blocks such as discussed above with respect to the camera panning across the scene, the regions of the image that are still well represented by the block matching approximation still benefit from the approximation. In general, the still image compression system is applied to a coding block comprising one or more of the BMA blocks in the frame being coded. Blocks outside of this coding block do not alter the results of the coding. Hence, coding blocks that are well approximated by the block motion approximation gain the advantages of the approximation even if other coding blocks are not well represented by the approximation.

In the preferred embodiment of the present invention, the BMA algorithm is blindly applied to each frame. If the current frame is poorly represented by the block motion approximation, the second stage image compression system will be forced to code all of the information by DCT compression algorithm. In the case of a new scene, the block motion approximation will improve as the frames of the new scene continue to be processed, and hence, the block-motion approximation will begin to provide a significant contribution to the compression of the video sequence.

Accordingly, the present invention does not require that BMA actually recognize the cases in which the search areas generated by displacement vectors are not generating good block matches. In the preferred embodiment of the present invention, the final displacement vector assigned to a block is set to zero if the best match was worse than a predetermined threshold value.

However, embodiments in which the BMA takes into account the quality of the match found can be constructed. Consider an embodiment of the present invention in which only the displacement vectors in the previous frame are utilized to predict the displacement vectors in the current frame, and hence, the search region corresponding to each block in the current frame. If there are regions of the current frame for which displacement vectors cannot be projected from the previous frame, the search region for the blocks in these regions is expanded. In effect, the corresponding blocks for blocks in these regions are found by performing a larger search such as used in the prior art BMAs. This embodiment of the present invention must record the regions for which displacement vectors are not defined. This tracking of undefined regions becomes cumbersome if the estimated displacement vectors in the current frame rely on the displacement vectors, or lack thereof, in a number of preceding frames. Further, the computational workload inherent in dealing with the undefined vectors increases rapidly with the number of preceding frames that is utilized in the estimation of the displacement vectors in the current frame. Hence, the preferred embodiment of the present invention does not utilize this method.

The BMA of the present invention may be utilized in any image processing system in which a sequence of images is being compressed. The method can be practiced on any conventional data processing system or on special purpose hardware.

The above-described embodiments of the present invention utilized a linear combination of the displacement vectors determined for the preceding frames to compute an approximation to the displacement vectors in the current frame. However, it will be obvious to those skilled in the art from the preceding discussion that more complex prediction algorithms utilizing non-linear combinations of the displacement vectors may also be utilized without departing from the teaching of the present invention.

The above-described embodiments utilized displacement vectors for the preceding frames to compute an approximation to the displacement vectors in the current frame. However, it will be obvious to those skilled in the art from the preceding discussion that the displacement vectors found in the current frame may also be included in the linear sums. Such embodiments make use of the correlation between the motion of the blocks in any given frame. As each displacement vector is computed in the current frame, it can be utilized in the linear sums in addition to the displacement vectors computed for the preceding frames.

The predicator coefficients in the embodiments described above were periodically updated. However, the predicator coefficients can be dynamically updated each time a new displacement vector is computed. Such dynamically computed predicator coefficients provide improved performance over the predicator coefficients computed on a periodic basis. However, the computational workload associated with dynamically computing the coefficients is also increased.

The above-described embodiments of the present invention determined a block motion approximation to a first frame by searching for a block in the preceding frame that matched each block in the first frame. However, embodiments of the present invention that search for matching blocks in earlier frames may also be constructed. Such an algorithm is useful in matching blocks in the first frame that were not well matched to blocks in the preceding frame. Consider the case in which the sequence of frames records the motion of a ball in front of a stationary background. As the ball moves, it obstructs the view of various portions of the background. Hence, two successive frames will be well matched except for the block in the second frame corresponding to a previously blocked portion of the background in the previous frame. This portion of the background, however, will be present in an earlier frame in which the ball had not yet reached this point in its trajectory. Accordingly, by trying to find matches in earlier frames, for blocks that poorly matched in the immediately preceding frame, a better motion estimation approximation can be generated given a limited search region.

Various modifications to the present invention will become apparent to those skilled in the art from the foregoing description and accompanying drawings. Accordingly, the present invention is to be limited solely by the scope of the following claims.

What is claimed is:

1. A method for operating a data processing system to compress a first frame in an ordered sequence of image frames, said first frame being preceded by a second frame in said sequence of frames and said second frame being preceded by a third frame in said sequence of frames, each frame comprising a plurality of processing blocks, said method comprising the steps of:

determining a displacement vector for at least one block in said second frame, said displacement vector identifying a region in said third frame, said identified region being an approximation of that block in said second frame;

determining an approximation for a displacement vector associated with one of said blocks in said first frame, said approximation depending on said determined displacement vector in said second frame;

utilizing said determined approximation to define a search region in a frame preceding said first frame corresponding to said block for which said approximation was determined, said search region comprising a plurality of sub-regions, each of said sub-regions having the same size as that block;

searching said search region for said sub-region in said search region that best approximates said corresponding block in said first frame thereby determining a displacement vector in said first frame; and determining a displacement vector for a block in each frame preceding said first frame in said ordered sequence, said determined displacement vector in each frame identifying the region in a preceding frame that best approximates that block, and wherein said step of determining an approximation for said displacement vector comprises forming a weighted combination of displacement vectors from at least one of two of said frames preceding said first frame.

2. The method of claim 1 wherein said weighted combination of displacement vectors comprises a linear weighted combination of said displacement vectors.

3. The method of claim 1 further comprising the step of determining weights to be used in said weighted combination such that said weighted linear combination of displacement vectors reproduces said determined displacement vectors.

4. The method of claim 3 further comprising the step of determining a displacement vector for said corresponding block in said first frame, said displacement vector measuring the displacement between said corresponding block in said first frame and said sub-region in said search region that best approximates that block.

5. The method of claim 4 further comprising the step of re-determining said weights if said determined displacement vector differs from said determined approximation by more than a predetermined amount utilizing said determined displacement vector for said first frame.

6. The method of claim 4 wherein said determined displacement vector is set to a predetermined value if said sub-region that best approximates that block differs from said block by more than a predetermined threshold value.

* * * * *